United States Patent
Howell et al.

[11] 3,726,464
[45] Apr. 10, 1973

[54] SOLDER WICK DEVICE

[76] Inventors: Thomas A. Howell, P. O. Box 4672; Dewey D. Selle, 1932 18th Place, both of Yuma, Ariz. 85364

[22] Filed: Nov. 28, 1969

[21] Appl. No.: 880,573

[52] U.S. Cl. ................................228/19, 206/56
[51] Int. Cl. .................................B23k 1/00
[58] Field of Search..............206/46 Y, 52 W, 56 M; 228/19, 57; 339/275; 29/426

[56] References Cited

UNITED STATES PATENTS

| | | | |
|---|---|---|---|
| 2,514,542 | 7/1950 | Guest | 206/56 M |
| 3,371,249 | 2/1968 | Prohofsky | 317/101 |
| 1,484,202 | 2/1924 | Baker | 339/275 |
| 2,809,748 | 10/1957 | Barnaby | 206/56 M |
| 2,575,960 | 11/1951 | Huntington | 206/52 W |
| 1,238,671 | 8/1917 | Holcomb | 228/35 |
| 3,245,597 | 4/1966 | Kopernak | 228/20 |
| 3,627,191 | 12/1971 | Hood, Jr. | 228/19 |

*Primary Examiner*—J. Spencer Overholser
*Assistant Examiner*—Robert J. Craig
*Attorney*—Berman, Davidson and Berman

[57] ABSTRACT

A desoldering device consisting of a cylindrical container housing a coil of stranded wire impregnated with a small amount of soldering flux, the container having an elongated outlet conduit through which the stranded wire is extended to act as a wick. The stranded wire absorbs melted solder by capillary action when the wire is held against a soldered joint and heat is applied thereto.

8 Claims, 4 Drawing Figures

PATENTED APR 10 1973 3,726,464
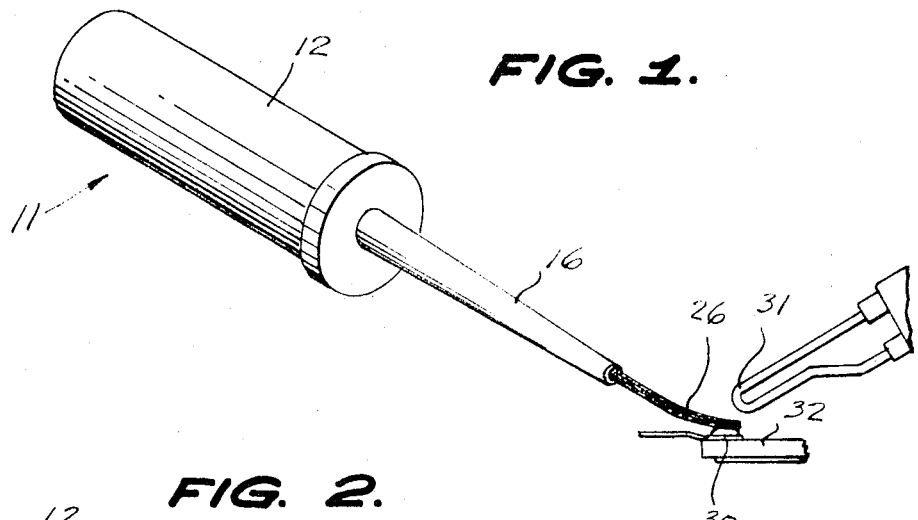
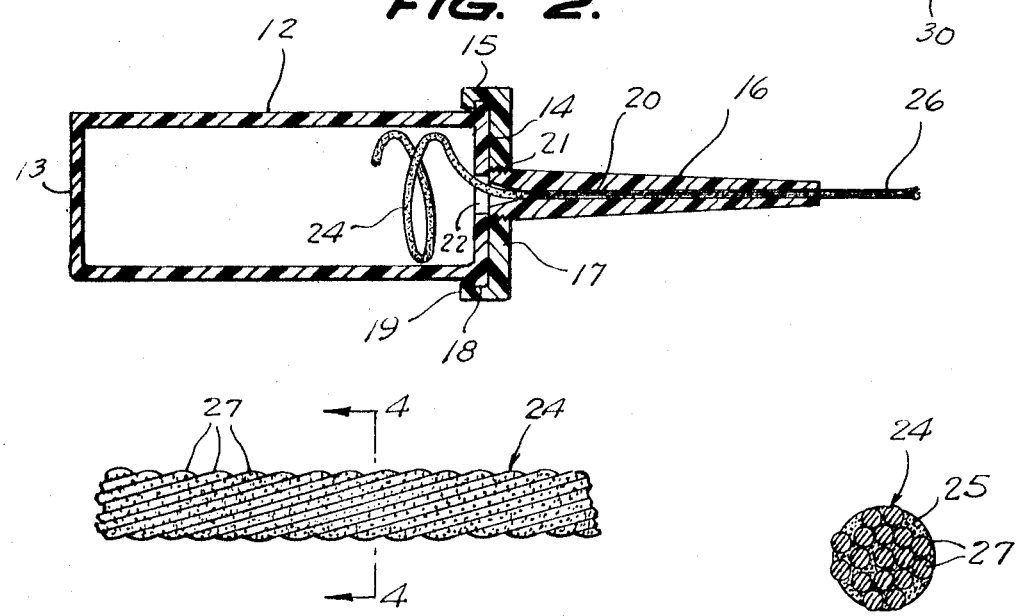
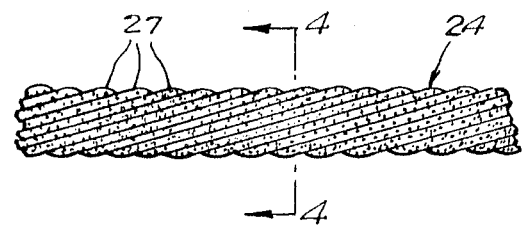
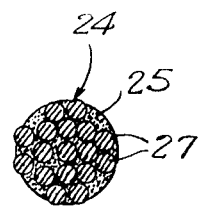
INVENTORS.
DEWEY D. SELLE,
THOMAS A. HOWELL,
BY
Berman, Davidson & Berman
ATTORNEYS.

SOLDER WICK DEVICE

This invention relates to solder removing devices, and more particularly to a desoldering device employing a wick which absorbs melted solder from a heated joint by capillary action.

A main object of the invention is to provide a novel and improved desoldering device for use in removing molten solder from electrical connections or from other types of soldered joints to facilitate the disconnection of the components associated with the joint, the desoldering device being relatively simple in construction, being safe to use, and acting to successfully remove the major portion of the molten solder to which it is applied.

A further object of the invention is to provide an improved desoldering device which involves inexpensive parts which is easy to manipulate, and which is provided with heat-insulating holding means so that it can be handled safely.

A still further object of the invention is to provide an improved desoldering device which employs an extensible solder-absorbing wick element, the device also serving as a container for a reserve supply of said wick element, and the device being so arranged that fresh portions of said wick element may be extended, as required.

Further objects and advantages will become apparent from the following description and claims, and from the accompanying drawings, wherein:

FIG. 1 is a perspective view of a typical desoldering device constructed in accordance with the present invention, shown with its wick element applied to a solder joint from which the solder is to be removed.

FIG. 2 is a longitudinal vertical cross-sectional view taken through the desoldering device of FIG. 1.

FIG. 3 is an enlarged fragmentary side elevational view of a portion of the wick element employed in the desoldering device of FIGS. 1 and 2.

FIG. 4 is an enlarged transverse vertical cross-sectional view taken substantially on line 4–4 of FIG. 3.

Referring to the drawings, 11 generally designates a solder-removing device constructed in accordance with the present invention. The device 11 comprises a generally cylindrical elongated container 12 of suitable heat-insulating material, such as polyethylene plastic material, the container 12 having the rear end wall 13 and the centrally apertured front end wall 14 provided with a peripheral flange or rib 15. The container 12 is of sufficient length so that it may readily serve as a handle for grasping the device, and since it is made of heat-insulating material, the container may be handled without risk of burning the user's hand.

Designated at 16 is a forwardly tapering elongated outlet conduit which is threadedly secured centrally in a circular supporting disk 17 provided with an annular gripping flange 18 having an inturned locking rim portion 19, forming a receiving cup or recess for the flanged front wall 14 of container 12, as is clearly shown in FIG. 2. The part 17 is preferably made of suitable somewhat resilient material, such as polyethylene plastic material, so that the cover member 17 may be easily snapped onto the flanged front wall 14 of the container 12 and thereafter be retained thereon. Part 16 is preferably made of a suitable heat-resistant, non-conductive material, such as Micarta, or similar material.

As shown in FIG. 2, the elongated conduit portion 16 has an axial central bore 20 merging at its rear end with the rearwardly flaring bore portion 21 which, in turn, is in registry with the central aperture 22 of the container right end wall 14, as viewed in FIG. 2. Disposed in the container 12 is a supply coil of stranded copper wire 24 impregnated with a moderate amount of solder flux 25, a forward portion of the stranded flux-impregnated wire extending through the bore 20 with a portion thereof externally exposed, as shown at 26.

The stranded wire 24 is preferably of sufficient mass so that it not only can absorb a substantial quantity of solder but also acts as a heat-absorbing element with respect to a joint to which it is applied, whereby it serves the purpose of a heat-sink and acts to minimize heat damage to delicate parts adjacent to the joint, as will be presently described.

The stranded wire 24 comprises spirally curved strands 27, as shown in FIG. 3, which are of conventional configuration, the wire 24 being of relatively standard construction.

This type of wire is relatively flexible and is somewhat resiliently compressible. The bore 20 is slightly less in diameter than the normal free diameter of the wire, so that the bore 20 exerts frictional holding force on the wire. However, the bore 20 is large enough to allow the wire 24 to be manually pulled through the bore 20, for example, when it is desired to renew the exposed wick portion 26.

In using the device to remove solder from a joint, for example, from the joint 30 shown in FIG. 1, the exposed wick portion 26 is held against the joint substantially in the manner illustrated in FIG. 1 and the hot soldering tip 31 of a soldering iron is laid over the wick device so as to transmit sufficient heat to the joint 30 to melt the solder thereof. The molten solder will be drawn into the wick element 26 by capillary action, and the major portion of the solder will thereby be removed from the joint 30, freeing the joint and allowing it to be thereafter easily disconnected. Thus, the solder can be removed from the joint sufficiently to allow the terminal wires thereof to be readily detached without damage to such terminal wires and without damage to the parts associated therewith. Furthermore, as above-mentioned, the wick element 26 serves as a heat sink device and prevents damage to the adjacent circuit board, shown at 32, or to delicate parts in close relationship to the point of application of the heat.

It will be noted that when the solder of the joint 30 melts, it wets the strands of the wick element 26, the wetting action being facilitated by the presence of the soldering flux 25, whereby the solder tins the wick element 26 and is drawn from the joint 30 onto the wick element by capillary action.

When it is desired to expose a fresh untinned length of stranded wire 24 for a subsequent desoldering operation, the previously tinned portion is cut off and the wire is pulled through the elongated outlet member 16 to expose a desired length of fresh untinned wire to be employed as a wick element.

It will be noted that since the parts of the device 11 are made of insulating material, there is no shock hazard involved in using the device, since the user's hand is completely insulated from the desoldering wick element 26.

When the supply of stranded wire has been used up, the original container 12 may be replaced by a fresh container provided with a new coil of wire. Thus, the front cover element 17 may be detached from the flanged front wall 14 of the old container and the end of the new piece of stranded wire can be engaged through the bore 20, after which the cover member 17 may be snapped onto the new supply container.

In a practical embodiment of the invention, supply container 12 can hold approximately 10 feet of a stranded wick wire 24 coiled generally in the manner illustrated in FIG. 2, namely, in such a manner that the wire can be pulled through the bore 20 easily without becoming tangled inside the container. This can be done if the wire is coiled to form a helix as illustrated in FIG. 2.

While a specific embodiment of an improved desoldering device has been disclosed in the foregoing description, it will be understood that various modifications within the spirit of the invention may occur to those skilled in the art. Therefore, it is intended that no limitation be placed on the invention except as defined by the scope of the appended claims.

What is claimed is:

1. A desoldering device comprising a holder having a dispensing aperture and a length of stranded wire carried by the holder and extending through said dispensing aperture, whereby the extended end portion of the wire may be employed as a solder wick element, wherein said stranded wire is impregnated with soldering flux, whereby to induce capillary action when the wick element is applied under heat to a solder joint, wherein said holder comprises an elongated container adapted to be employed as a handle, and wherein said holder has an elongated substantially rigid relatively small-diameter conduit portion communicating with said dispensing aperture, said stranded wire extending through and frictionally engaging in said conduit portion, whereby the extended end portion of the wire is substantially supported against flexure adjacent the end of the conduit portion.

2. The desoldering device of claim 1 and wherein said holder comprises an elongated container substantially axially aligned with said conduit portion.

3. The desoldering device of claim 2 and wherein said container is made of insulating material.

4. The desoldering device of claim 3 and wherein said container is generally cylindrical and said stranded wire is substantially helically coiled therein.

5. The desoldering device of claim 2 and wherein said container has a front wall provided with a peripheral flange and said elongated conduit portion has a transverse support element lockingly engagable with said peripheral flange.

6. The desoldering device of claim 5 and wherein said transverse support element comprises a cover disk formed with a recess lockingly receiving said container front wall.

7. The desoldering device of claim 6, and wherein said container comprises polyethylene plastic material.

8. The desoldering device of claim 6, and wherein said conduit portion comprises Micarta.

* * * * *